US011762956B2

(12) United States Patent
Vaid et al.

(10) Patent No.: US 11,762,956 B2
(45) Date of Patent: Sep. 19, 2023

(54) ADAPTIVE PATTERN RECOGNITION FOR A SENSOR NETWORK

(71) Applicant: Oracle International Corporation, Redwood Shores, CA (US)

(72) Inventors: Amit Vaid, Bengaluru (IN); Karthik Gvd, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 298 days.

(21) Appl. No.: 17/245,245

(22) Filed: Apr. 30, 2021

(65) Prior Publication Data

US 2022/0253652 A1 Aug. 11, 2022

(30) Foreign Application Priority Data

Feb. 5, 2021 (IN) .............................. 202141004994

(51) Int. Cl.
*G06F 18/25* (2023.01)
*G06V 10/46* (2022.01)
(Continued)

(52) U.S. Cl.
CPC .......... *G06F 18/251* (2023.01); *G06F 18/214* (2023.01); *G06F 18/22* (2023.01);
(Continued)

(58) Field of Classification Search
CPC .. G06F 18/251; G06F 18/22; G06F 18/24147; G06F 18/214; G06F 18/2433; G06V 10/464
(Continued)

(56) References Cited

U.S. PATENT DOCUMENTS

| 5,710,723 A | 1/1998 | Hoth et al. |
| 7,743,086 B2 | 6/2010 | Hu et al. |

(Continued)

FOREIGN PATENT DOCUMENTS

| CN | 101295177 B | 8/2010 |
| CN | 110967690 A | 4/2020 |

(Continued)

OTHER PUBLICATIONS

Harrou et al, Kullback-Leibler distance-based enhanced detection of incipient anomalies, Aug. 31, 2016, 15 pages (Year: 2016).

(Continued)

*Primary Examiner* — Aditya S Bhat
(74) *Attorney, Agent, or Firm* — Potomac Law Group, PLLC; Donna Perez

(57) ABSTRACT

Embodiments match sensor data output by a sensor to a trained pattern. Embodiments form a plurality of windows of an identified pattern from the sensor data, each of the plurality of windows having a substantially equal window length to a length of the trained pattern. For each of the windows, embodiments generate a corresponding first Symbolic Aggregate approximation ("SAX") word, determine a Hamming distance between the first SAX word and a second SAX word corresponding to the trained pattern, and determine a final distance score based on coefficients between the first SAX word and the second SAX word. For each of the windows, embodiments determine a number of positions in the first SAX word that do not contribute to the final distance score, update the Hamming distance after eliminating the number of positions and determine an average distance based on the final distance score and the updated Hamming distance.

20 Claims, 8 Drawing Sheets

(51) Int. Cl.
  *G06F 18/22*      (2023.01)
  *G06F 18/214*     (2023.01)
  *G06F 18/2433*    (2023.01)
  *G06F 18/2413*    (2023.01)

(52) U.S. Cl.
  CPC .... *G06F 18/2433* (2023.01); *G06F 18/24147* (2023.01); *G06V 10/464* (2022.01)

(58) Field of Classification Search
  USPC ........................................................ 702/189
  See application file for complete search history.

(56) References Cited

U.S. PATENT DOCUMENTS

| | | | |
|---|---|---|---|
| 8,356,207 | B2 | 1/2013 | Hosek et al. |
| 8,495,060 | B1 | 7/2013 | Chang |
| 9,160,760 | B2 | 10/2015 | Vasseur et al. |
| 9,336,493 | B2 | 5/2016 | Lee et al. |
| 2010/0012161 | A1 | 1/2010 | Classen et al. |
| 2012/0166142 | A1 | 6/2012 | Maeda et al. |
| 2013/0318011 | A1 | 11/2013 | Jones et al. |
| 2015/0189068 | A1 | 7/2015 | Mohan et al. |
| 2015/0223309 | A1 | 8/2015 | Mohan et al. |
| 2015/0363699 | A1 | 12/2015 | Nikovski et al. |
| 2016/0004237 | A1 | 1/2016 | Mohan et al. |
| 2016/0217378 | A1 | 7/2016 | Bellala et al. |
| 2016/0285913 | A1 | 9/2016 | Itskin et al. |
| 2016/0328253 | A1 | 11/2016 | Majumdar |
| 2016/0356633 | A1 | 12/2016 | Mohan et al. |
| 2017/0177812 | A1 | 6/2017 | Sjölund |
| 2017/0192098 | A1 | 7/2017 | Cho |
| 2017/0309094 | A1 | 10/2017 | Farahat et al. |
| 2018/0039555 | A1 | 2/2018 | Salunke et al. |
| 2018/0177415 | A1 | 6/2018 | Madl |
| 2018/0211176 | A1 | 7/2018 | Khurshudov et al. |
| 2018/0268264 | A1 | 9/2018 | Marwah et al. |
| 2018/0365136 | A1 | 12/2018 | Kumar et al. |
| 2019/0138423 | A1 | 5/2019 | Agerstam et al. |
| 2020/0050825 | A1 | 2/2020 | Mendoza-Schrock |
| 2021/0095996 | A1 | 4/2021 | Gvd et al. |
| 2021/0263969 | A1* | 8/2021 | Sun ........................ G06F 18/23 |

FOREIGN PATENT DOCUMENTS

| | | |
|---|---|---|
| WO | 2009046185 A2 | 4/2009 |
| WO | 2018025008 A1 | 2/2018 |
| WO | 2019019429 A1 | 1/2019 |

OTHER PUBLICATIONS

Xie et al., Distributed Segment-Based Anomaly Detection with Kullback-Leibler Divergence in Wireless Sensor Networks, Jan. 2017, IEEE Transactions on Information Forensics and Security, vol. 12, No. 1, pp. 101-110 (Year: 2017).
U.S. Appl. No. 16/585,764, filed Sep. 27, 2019, Karthik Gvd.
U.S. Appl. No. 16/699,023, filed Nov. 28, 2019, Amit Vaid.
U.S. Appl. No. 16/806,275, filed Mar. 2, 2020, Amit Vaid.
Afgani et al., "Anomaly Detection Using the Kullback-Leibler Divergence Metric", https://www.researchgate.net/publication/224369692_Anomaly_Detection_Using_The_Kullback-Leibler_Divergence Metric, last downloaded Apr. 15, 2019.
Andrea Giantomassi, Electric Motor Fault Detection and Diagnosis by Kernel Density Estimation and Kullback-Leibler Divergence based on Stator Current Measurements, 11 pages, printed Mar. 4, 2021 (Year: 2021).
Bjorn Barz, Detecting Regions of Maximal Divergence for Spatio-Temporal Anomaly Detection, May 2019, 14 pages (Year: 2019).
Cao et al., "SOMKE: Kernel Density Estimation Over Datastreams by Sequences of Self-Organizing Maps", IEEE Transactions on Neural Networks and Learning Systems, vol. 23, No. 8, Aug. 2012, http://www.bme.ele.uri.edu/faculty/he/PDFfiles/somke.pdf.
Cortes, "Variable Weight Kernel Density Estimation", a dissertation submitted in partial fullfillment of the requirements for the degree of Doctor of Philosophy in the University of Michigan, 2017.
Filippone et al., "Information Theoretic Novelty Detection", Technical Report CS-09-02, Feb. 2009, pp. 1-23, http://www.dcs.gla.ac.uk/~maurizio/Publications/tech_rep_info_theo09.pdf.
Hiroaki Sasaki, Direct Density-Derivative Estimation and Its Application in KL-Divergence Approximation, 12 pages, Jun. 30, 2014 (Year: 2014).
Kevin R. Moon, Ensemble Estimation of Information Divergence, 39 pages, 2018 (Year: 2018).
Kim et al., "Robust Kernel Density Estimation", Journal of Machine Learning Research 13 (2012) 2529-2565, Published Sep. 2012.
Noriega et al., "Quantitative analysis of timing in animal vocal sequences", Feb. 21, 2019, pp. 1.23 https://arxiv.org/pdf/1902.07650.pdf.
Unknown, "Oracle Maintenance Cloud", Oracle Business Process Services, last downloaded on Nov. 27, 2019.
Xie et al., "Distributed Segment-Based Anomaly Detection With Kullback-Leibler Divergence in Wireless Sensor Networks", https://www.researchgate.net/publication/307438982_Distributed_Segment-Based_Anomaly_Detection_With_Kullback-Leibler_Divergence_in_Wireless_Sensor_Networks, last downloaded Apr. 12, 2019.
Youssef et al., "An optimal fault detection threshold for early detection using Kullback-Leibler Divergence for unknown distribution data", ScienceDirect, Signal Processing, vol. 120, Mar. 2016, pp. 266-279.

* cited by examiner

ADAPTIVE PATTERN RECOGNITION FOR A SENSOR NETWORK

FIELD

One embodiment is directed generally to a pattern recognition, and in particular to the pattern recognition in a sensor network.

BACKGROUND INFORMATION

The Internet of Things ("IoT") is the extension of Internet connectivity into physical devices and everyday objects. Embedded with electronics, Internet connectivity, and sensors, these devices can communicate and interact with others over the Internet, and they can be remotely monitored and controlled.

However, within the IoT, anomaly in measurements of assets by sensors may occur due to sensor failure, abnormal changes of the monitored assets or environments, etc. As the number of devices that may be connected exceeds millions or even billions, automatic, accurate and efficient anomaly detection becomes increasingly important. Pattern recognition is sometimes used to identify an anomalous sensor data by comparing time series data against known non-anomalous time series data.

SUMMARY

Embodiments match sensor data output by a sensor to a trained pattern. Embodiments form a plurality of windows of an identified pattern from the sensor data, each of the plurality of windows having a substantially equal window length to a length of the trained pattern. For each of the windows, embodiments generate a corresponding first Symbolic Aggregate approximation ("SAX") word, determine a Hamming distance between the first SAX word and a second SAX word corresponding to the trained pattern, and determine a final distance score based on coefficients between the first SAX word and the second SAX word. For each of the windows, embodiments determine a number of positions in the first SAX word that do not contribute to the final distance score, update the Hamming distance after eliminating the number of positions, determine an average distance based on the final distance score and the updated Hamming distance, and compare the average distance to a predefined distance value.

DETAILED DESCRIPTION

One embodiment compares known patterns with generated patterns from a sensor to recognize and detect the same or different patterns. Embodiments identify a "hamming" distance between patterns to accommodate for tolerance between the patterns so that an exact match is not required. The matching and recognition of patterns is used to determine the presence or absence of an anomaly for the individual sensor.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
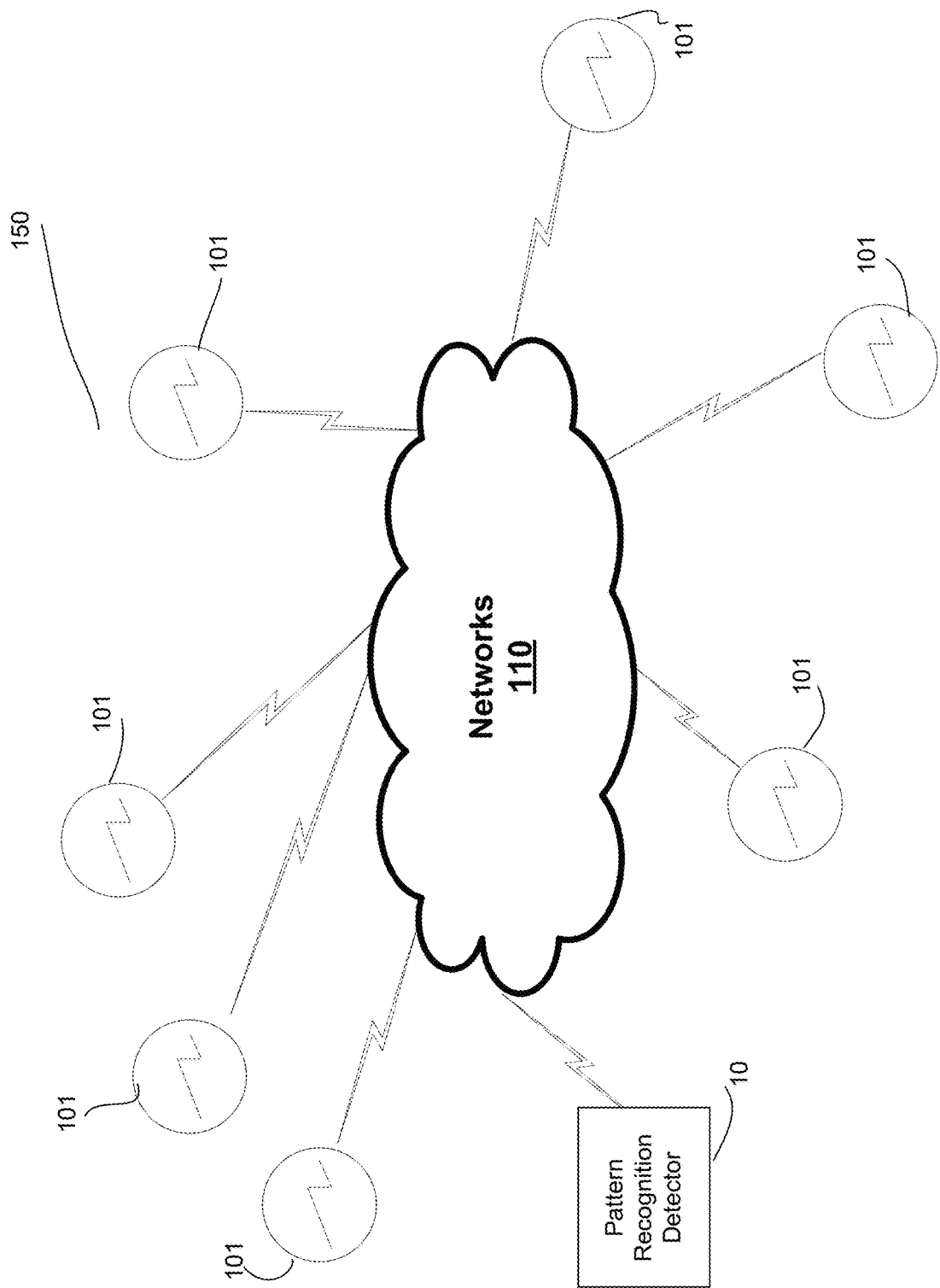
FIG. 1 is an overview diagram of elements of an anomaly detection network/system that can implement embodiments of the invention.

FIG. 1 is an overview diagram of elements of an anomaly detection network/system 150 that can implement embodiments of the invention. Sensor based network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101 (millions or billions of sensors, for example).

An IoT device can be any device that has a sensor attached to it and can transmit data from one object to another or to people with the help of Internet. IoT devices include wireless sensors, software, actuators, and computer devices. They are attached to a particular object that operates through the Internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. As another example, sensor network 150 may be used in a smart building, where sensors 101 measure such parameters as air temperature, humidity, building occupancy, lighting, etc., for purposes of managing heating, ventilation, air conditioning and lighting systems and optimizing the use of resources, such as electricity, gas and water. As yet another example, sensor network 150 may be used in a utility infrastructure, where sensors 101 acquire data that monitor power, water, and so forth for efficient resource management.

Each of sensors 101 communicate, wirelessly or wired, through one or more networks 110. Networks 110 include the Internet, but may also include private on-premise networks that ultimately interface with the Internet as well as any other type of network that allows sensors 101 to communicate. Network 150 in general is a multi-sensor environment in that each asset to be monitored is monitored by two or more sensors. For example, an asset can be monitored simultaneously by both by a temperature sensor, a pressure sensor and a wear sensor.

Monitored assets can be found, for example, in the area of manufacturing, facilities management, mining, hospitals, or any other industry where assets are critical. In facilities, monitored assets may include HVAC systems, forklifts, office equipment such as copiers, or high value machinery. In manufacturing, monitored assets may include lathes, boilers, extruders, milling, drilling, and shaping machines. In hospitals, monitored assets may include patient beds, ultrasound machines, medicine storage, and blood infusion pumps. In mining, monitored assets may include excavators, loaders, dumpers, drag lines, shovels, rigs, and generators.

A pattern recognition detector 10 is coupled to networks 110 to send and receive data from sensors 101. Pattern recognition detector 10 provides the pattern recognition and detection functionality disclosed herein. In general, pattern recognition detector 10 monitors data acquired by each of sensors 101 for purposes of detecting outliers, or anomalies, in that sensor's data using adaptive pattern recognition. A given sensor 101 may provide anomalous data due to errant operation of the sensor such as from the failure of a sensor 101, the impending failure of a sensor 101, an errant operation of a sensor 101 due to for example, a misconfiguration or malicious activity, when a condition (e.g., temperature) exceeds a predetermined threshold, etc.

Sensors 101 can be largely dispersed geographically, such as with temperature sensors located throughout the world, or more locally dispersed. For example, a machine can be fitted with sensors 101 to monitor its operation. These sensors measure quantities such as temperature, pressure, and vibration amplitude for the different parts of the machine. If there is some malfunction or any other abnormality, some of these readings will deviate significantly from the norm. For example, it may be the case that a small part of the engine is overheated when compared to the rest of the engine, or that the entire engine is overheated when compared to the rest of the machine.

Figure 2:
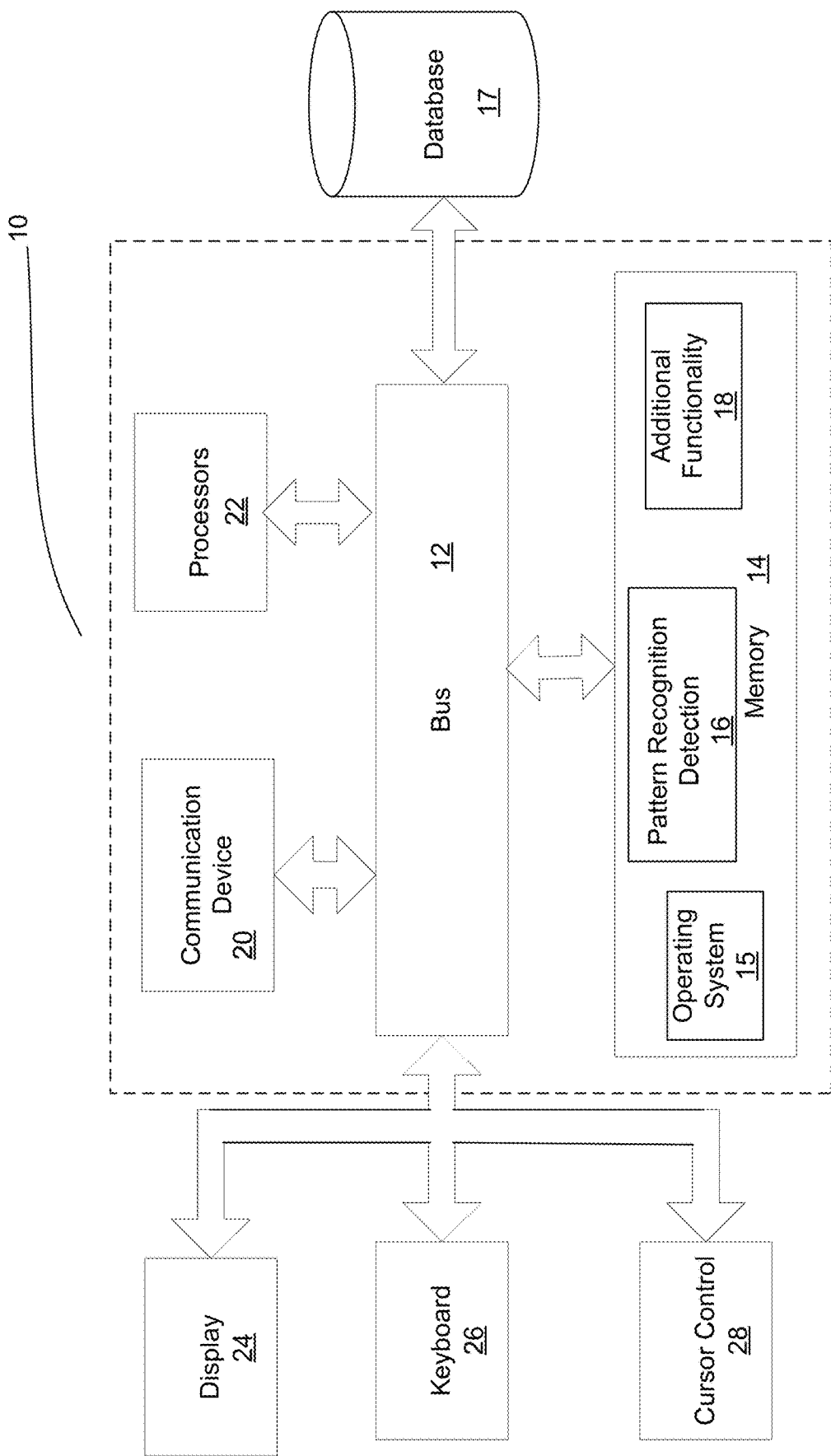
FIG. 2 is a block diagram of pattern recognition detector of FIG. 1 in the form of a computer server/system in accordance with an embodiment of the present invention.

FIG. 2 is a block diagram of pattern recognition detector 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a pattern recognition detection module 16 that detects anomalies in each individual sensor of a network of sensors using adaptive pattern recognition, and all other functionality disclosed herein. System 10 can be part of a larger system. Therefore, system 10 can include one or more additional functional modules 18 to include the additional functionality, such as the "IoT Asset Monitoring Cloud Service" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As discussed, in the IoT environment, advances in processor technologies and wireless communications have enabled the deployment of small, low cost and power efficient sensors. Anomaly detection involves monitoring the physical environment and highlighting events of interest as well as detecting problems in the sensor network. However, IoT sensors have limited resource capabilities, and the large amount of incoming different streams of data needs to be examined dynamically.

One known solution to anomaly detecting is to perform pattern recognition on continuously streamed IoT sensor data to detect differences between known patterns. However, pattern recognition on IoT sensor based data is a challenging task, often because of the long wavelength and some deviation in the frequency of an individual sensor over time. The "wavelength" in IoT sensor data is the distance between identical points (adjacent crests) in the adjacent cycles of a waveform signal propagated in space or along a wire. This could be a sinusoidal/square or any other wave form. Therefore, it is difficult to find exact patterns, even in the absence of anomalies, which can lead to false positives.

A feasible solution needs to be tolerant enough to accommodate subtle changes in the pattern of time series data generated by an individual IoT sensor during normal operations (i.e., not anomalous data). Some known solutions utilize the Symbolic Aggregate approximation ("SAX") approach for pattern recognition. SAX is both time- and space-efficient, and defines a distance measure that guarantees the distance between two SAX strings to be no larger than the true distance between the original time series. This lower-bounding property is at the core of almost all algorithms in time series data mining. It plays an important role in indexing and similarity search, since it is the essential key to guarantee no false dismissal of results. In general, without a lower-bounding distance measure, the approximate solution cannot be meaningfully computed in the representation space, since the approximate solution obtained may be arbitrarily dissimilar to the true solution obtained from the original data.

SAX performs the discretization by dividing a time series into w equal-sized segments. For each segment, the mean value for the points within that segment is computed. Aggregating these w coefficients forms the Piecewise Aggregate Approximation ("PAA") representation of T. Each coefficient is then mapped to a symbol according to a set of breakpoints that divide the distribution space into a equiprobable regions, where $\alpha$ is the alphabet size specified by the user. If the symbols were not equiprobable, some of the symbols would occur more frequently than others.

Specifically, SAX transforms a time-series X of length n into the string of arbitrary length $\omega$, where $\omega \ll n$ typically, using an alphabet A of size a>2. The algorithm includes two steps: (i) it transforms the original time-series into the PAA representation and (ii) it converts the PAA data into a string.

The use of PAA brings advantages of a simple and efficient dimensionality reduction while providing the important lower bounding property. The actual conversion of PAA coefficients into letters by using a lookup table is also computationally efficient. Discretization of the PAA representation of a time-series into SAX is implemented in a way which produces symbols corresponding to the time-series features with equal probability. The values of z-normalized time-series generally follow the Normal distribution. By using its properties it is relatively easy to pick an equal-sized areas under the Normal curve using lookup tables for the cut lines coordinates, slicing the under-the-Gaussian-curve area.

However, the SAX algorithm expects that the data that the patterns are trained on and on which they are scored share the same wavelength. This assumption is too strict in a real time sensor environment. Further, since the SAX algorithm is supposed to continuously monitor incoming data against a known small pattern, there are times when close enough patterns are missed. This may create a false negative where a pattern that should have been identified as matching is missed by the algorithm In contrast, embodiments are tuned to allow some tolerance in detecting closer to SAX word patterns.

Figure 3:
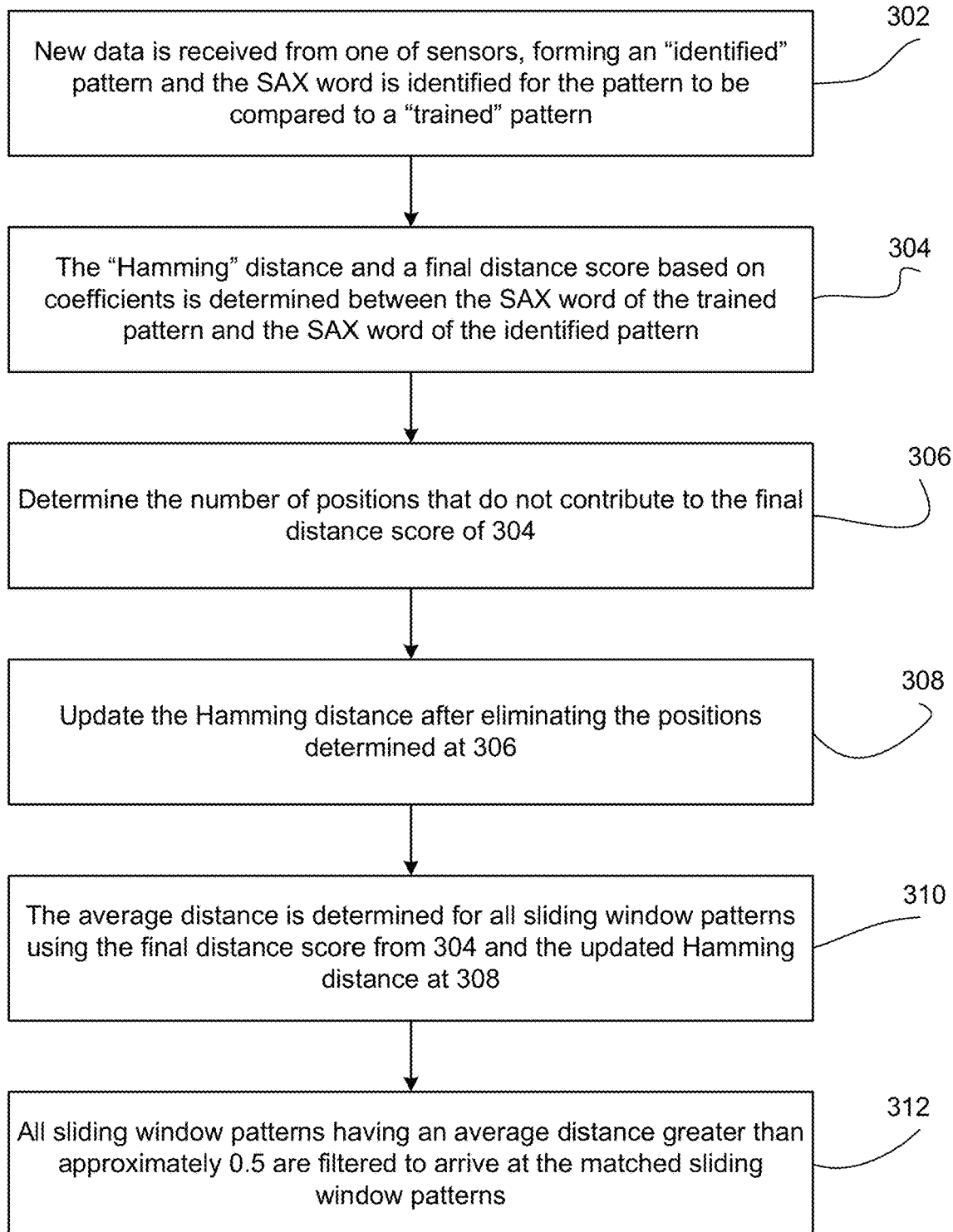
FIG. 3 is a flow diagram of the functionality of pattern recognition detection module of FIG. 2 for detecting anomalies in a sensor of a sensor network based on pattern recognition in accordance with one embodiment.

FIG. 3 is a flow diagram of the functionality of pattern recognition detection module 16 of FIG. 2 for detecting anomalies in a sensor of a sensor network based on pattern recognition in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, "new" data is received from one of sensors 101, forming an "identified" pattern and the SAX word is identified for the pattern. The new data is time-series data in the form of messages or data points that are sent on a fixed time schedule from each sensor 101, although different sensors have different frequencies at which the messages are sent, and the frequency and wavelength from an individual sensor 101 can vary over time. For example, each sensor can send a data point every minute or every hour. For the sensor 101, a known pattern of data points with no anomalies (i.e., cleaned data") is stored, referred to as the "trained" pattern. In embodiments, the user selects a window from a user interface ("UI") that captures slice of a known clean pattern or any other pattern that the user wants to monitor, and creates an alert in the system when such a pattern recurs.

Figure 4:
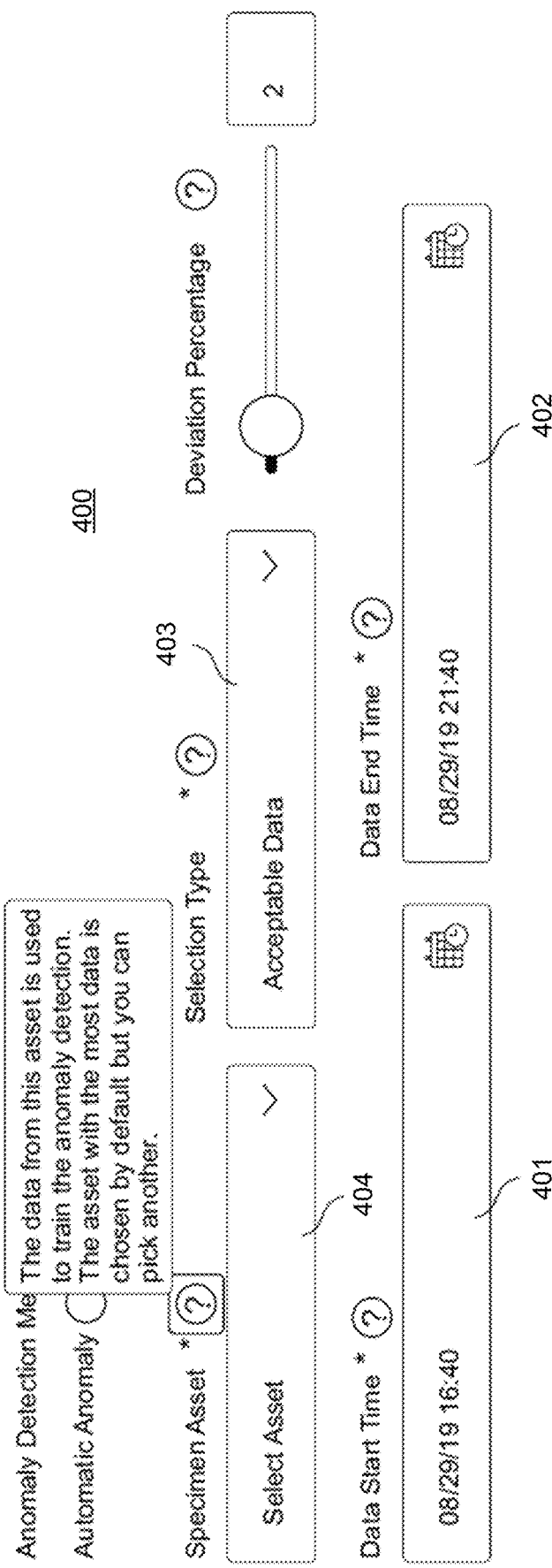
FIG. 4 illustrates a screenshot of a user interface for receiving data in accordance with embodiments.

FIG. 4 illustrates a screenshot of a user interface 400 for receiving data at 302 in accordance with embodiments. At 404, the asset, and corresponding one or more sensors that are monitoring the asset, is selected. At 403, the type of data is selected, which for 302 is "acceptable data" (i.e., anomaly-free data) because it is assumed that the sensor is behaving properly during this timeframe. At 401 and 402, the start time and end time of the collected data is specified. For example, four days of anomaly-free data from a temperature and pressure sensor can be specified on UI 400.

Figure 5:
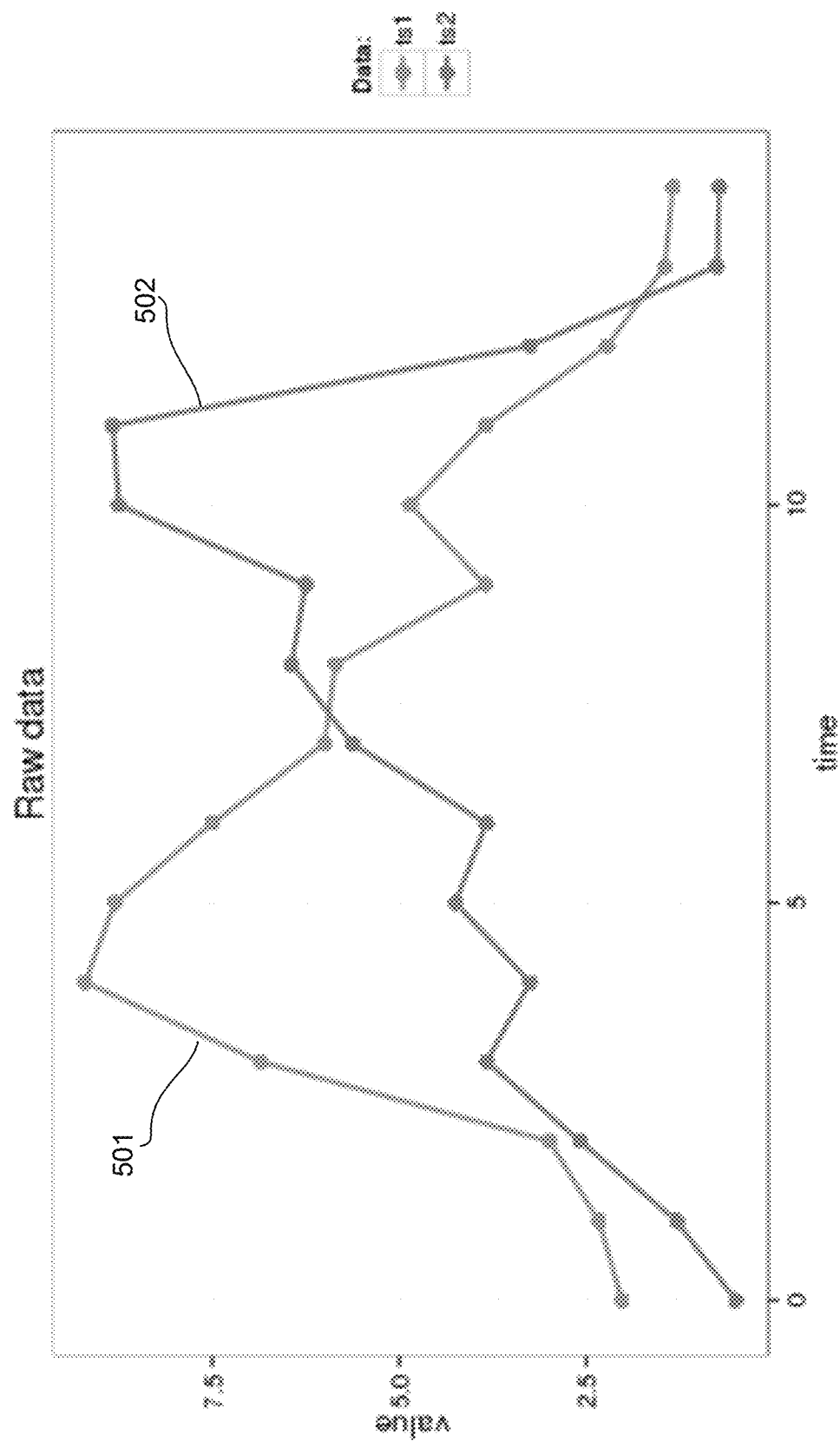
FIG. 5 illustrates an example of an identified pattern in comparison to a trained pattern.

FIG. 5 illustrates an example of an identified pattern 501 in comparison to a trained pattern 502, each pattern derived from by a plurality of data points during a time series of data points.

At 304, the "Hamming" distance and corresponding distance score based on coefficients is determined between SAX word of the trained pattern and the SAX word of the identified pattern. The Hamming distance between two strings of equal length is the number of positions at which the corresponding symbols are different. In other words, it measures the minimum number of substitutions required to change one string into the other, or the minimum number of errors that could have transformed one string into the other. The Hamming distance between two equal-length strings of symbols is the number of positions at which the corresponding symbols are different. The Hamming distance is the distance between two words/characters and is the number of bits which are different at the same position in both respective places.

Since SAX is an approximation technique, in embodiments, for the data points of the time series, it depends on the word length in determining what SAX word should represent the time series. For example, for an 8 word length with 4 alphabets, the time series will be divided into 8 horizontal equal splits and be represented by 4 characters.

Figures 6A, 6B:
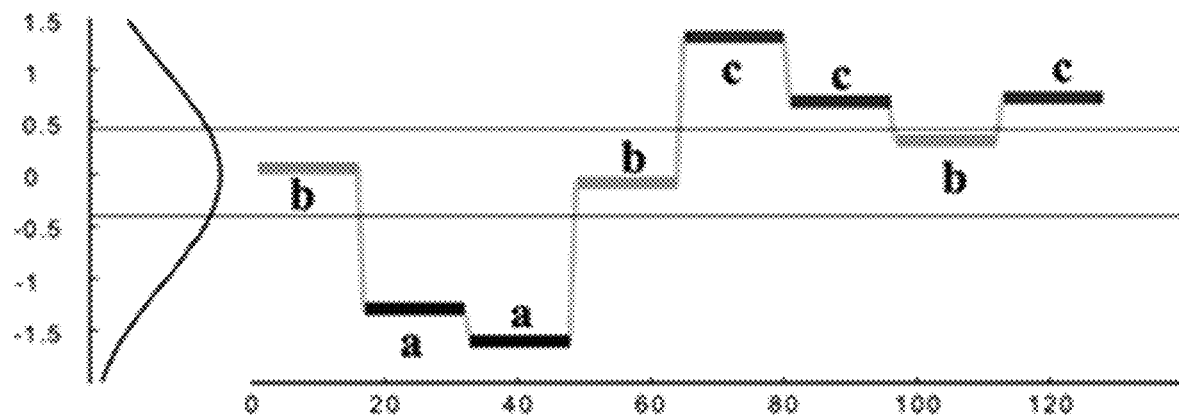
FIG. 6A is an example map/image that visualizes how the PAA coefficients can assist in the discretization and distance calculation in accordance to embodiments.
FIG. 6B is an example table showing breakpoints that divide a Gaussian distribution in an arbitrary number (from 3 to 10) of equiprobable regions in accordance to embodiments.

For example, assume a time series data with time on the X axis and the distribution of data on the Y axis after discretization. FIG. 6A is an example map/image that visualizes how the PAA coefficients can assist in the discretization and distance calculation in accordance to embodiments. Consider an example with two SAX words "bgbgbg" (identified during training), and "ahbgab" (identified during scoring). To identify the distance between these two words, embodiments mathematically measure the distance at corresponding positions. There are two different distances determined: 1) Distance score based on coefficients; and 2) the Hamming distance.

Distance Score Based on Coefficients a) Considering the two SAX words, embodiments first get letters at corresponding positions. In the example, letters at corresponding positions for bgbgbg and ahbgab are ba, gh, bb, gg, ba, gb.

b) FIG. 6B is an example table showing breakpoints that divide a Gaussian distribution in an arbitrary number (from 3 to 10) of equiprobable regions in accordance to embodiments. Based on the table of FIG. 6B showing PAA coefficients, coefficient values are known when the distribution is divided into alphabet size of 8. (breakpoints [−1.15, −0.67, −0.32, 0, 0.32, 0.67, 1.15]).

c) Embodiments identify distances for all possible combination of alphabet size 8. (abcdefgh), which means [letters=aa,ab,ac,ad,ae,af,ag,ah,ba,bb,bc,bd,be,bf,bg, bh, . . . ,hh] using the below psuedocode:

b) If the letters at corresponding positions are not the same then it contributes to distance '1'. In the above example there are 4 such instances. Therefore, the hamming distance in the above example is 4. Specifically, per the above example, the identified distances between characters and the distance score is determined as follows:

Identified distance between characters :ad -> 0.8299999999999998,hb -> 1.8199999999999998,gf ->0.0, eh -> 0.8299999999999998,fd -> 0.32,he -> 0.8299999999999998,fg -> 0.0,eb -> 0.67,df -> 0.32,gc -> 0.99,ca -> 0.47999999999999987,ac -> 0.47999999999999987,bh -> 1.8199999999999998,cd -> 0.0,fa -> 1.47,ee -> 0.0,af -> 1.47,bb -> 0.0,cg -> 0.99,dc -> 0.0,hg -> 0.0,be -> 0.67,gb -> 1.34,ge -> 0.35000000000000003,ed -> 0.0,ha -> 2.3,hd -> 1.15,eg -> 0.35000000000000003,db -> 0.35000000000000003,gh -> 0.0,cf -> 0.64,fc -> 0.64,ah -> 2.3,de -> 0.0,ea -> 1.15,ff -> 0.0,bd -> 0.35000000000000003,bg -> 1.34,ab -> 0.0,cc -> 0.0,dh -> 1.15,ae -> 1.15,hc -> 1.47,ba -> 0.0,hf -> 0.47999999999999987,ga -> 1.8199999999999998,fe -> 0.0,gd -> 0.67,dg -> 0.67,ec -> 0.32,fh -> 0.47999999999999987,fb -> 0.99,ef -> 0.0,da -> 0.8299999999999998,gg -> 0.0,ce -> 0.32,ag -> 1.8199999999999998,bc -> 0.0,ch -> 1.47,dd -> 0.0,aa -> 0.0,cb -> 0.0,bf -> 0.99 distanceScore(bgbgbg, ahbgab)=dist (ba)+dist(gh)+dist(bb)+dist(gg)+dist(ba)+dist(gb)

After determining the final distance score with respect to the coefficients at 304, at 306 the number of positions that actually contribute to the final distance score are tracked. The "positions" refers to corresponding index of characters in a given SAX words. In the above example the characters at the first position are 'b' and 'a'. The distance between these two characters are '0' and so this particular combination is not contributing to the score. Embodiments keep track of number of positions that do not contribute to distance score.

At 308, the Hamming distance is updated after eliminating the positions at 306. In above example the Hamming distance is initially 4. However, position 1, 2, 5 have scores as '0' which do not contribute to distance score. Therefore, the updated hamming distance is 4−3 or 1. Specifically, consider two SAX words. Embodiments first determine the letters at corresponding positions. In the above example,

```
dict = Map(String,Number)
for (i <- letters.indices) {
    for (j <- letters.indices) {
        if (Math.abs(i − j) <= 1) {
            dict += (letters(i).toString + letters(j).toString) -> 0.0
        }
        else {
            val high_num = Math.max(i, j) − 1
            val low_num = Math.min(i, j)
            dict += (letters(i).toString + letters(j).toString) -> (breakpoints(high_num) − breakpoints(low_num))
        }
    }
}
``` d) From the map of FIG. 6A, which shows how discretization is done for alphabet size 3 considering breakpoints coefficients from the table of FIG. 6B, embodiments fetch all the distances for the combinations mentioned in step 'a' and add. The total distance based on coefficients is referred to as the "final distance score"

Hamming Distance a) Considering the two SAX words, embodiments first get letters at corresponding positions. In the example, letters at corresponding positions for bgbgbg and ahbgab are ba, gh, bb, gg, ba, gb.

letters at corresponding positions for 'bgbgbg' and 'ahbgab' are ba, gh, bb, gg, ba, gb. Referring to the determined distance scores shown above, the score is 0 for 'ba', 'gh', 'bb', 'gg', 'ba' except 'gb'.

At 310, once the updated/final hamming distance is determined at 308 and the updated/final distance score is determined at 304 using SAX coefficients, the average distance is determined as follows:

Average Distance=totalDistanceScore/updatedHammingDistance

The average distance is determined for all sliding window patterns. For example, consider as a user input a pattern selecting a data range from time T1 to T2 (e.g., using the UI of FIG. 4). Assume that the particular sensor of interest between time T1 and T2 generates 20 datapoints. As 302, the SAX word is identified for this pattern. Now when the scoring is done at 304 there are more than 20 datapoints. For example, assume there are now 30 datapoints. Because the input is 20 datapoints, embodiments window these 30 datapoints into multiple chunks of 20 datapoints to compare with trained pattern of 20 datapoints. Therefore, multiple windows are created with 1-20, 2-21,3-22 . . . 10-30 datapoints, resulting in 10 sliding windows. For each of these 10 patterns, embodiments create a SAX word and compare it with the trained SAX word.

At 312, after the average distance is determined for all the sliding window patterns, all of the patterns with the average distance>0.5 are filtered. For example, for the 10 sliding windows described above, embodiments filter all the windows which has average distance greater than 0.5 value, or substantially close to 0.5. Other predefined values can be used but as the value is increased the number of false positives increases.

The 0.5 denotes that the identified pattern is two alphabets away from the trained pattern. For example, in FIG. 6A, the time series is divided on the Y axis with respect to its gaussian distribution and alphabet is assign to it. As shown, the distance between 'a' and 'c' is 0.43. As shown in FIG. 6A, the distance between alphabets at two distances is close to 0.5. Where patterns with a distance of zero and with a threshold less than 0.5 are identified, only the zero distance patterns are saved as detected patterns (i.e., matched patterns), with the remaining patterns as unmatched, potentially indicating anomalies. If none of the sliding window patterns has a zero distance score, then all the identified patterns less than 0.5 are saved as detected/matched patterns.

As a result of the functionality of FIG. 3, a subset of sliding windows matching the pattern are identified. The size of the sliding windows in embodiments in equal to the size of the pattern selected by the user.

The goal of the above functionality is to identify the pattern given as input by the user. Although in embodiments the pattern matching is used to detect anomalous behavior of the sensor, embodiments can also be used to identify a pattern that the user may otherwise be interested in. Therefore, embodiments attempt to detect a pattern that is as close as possible to the one given as input by the user.

Figure 7:
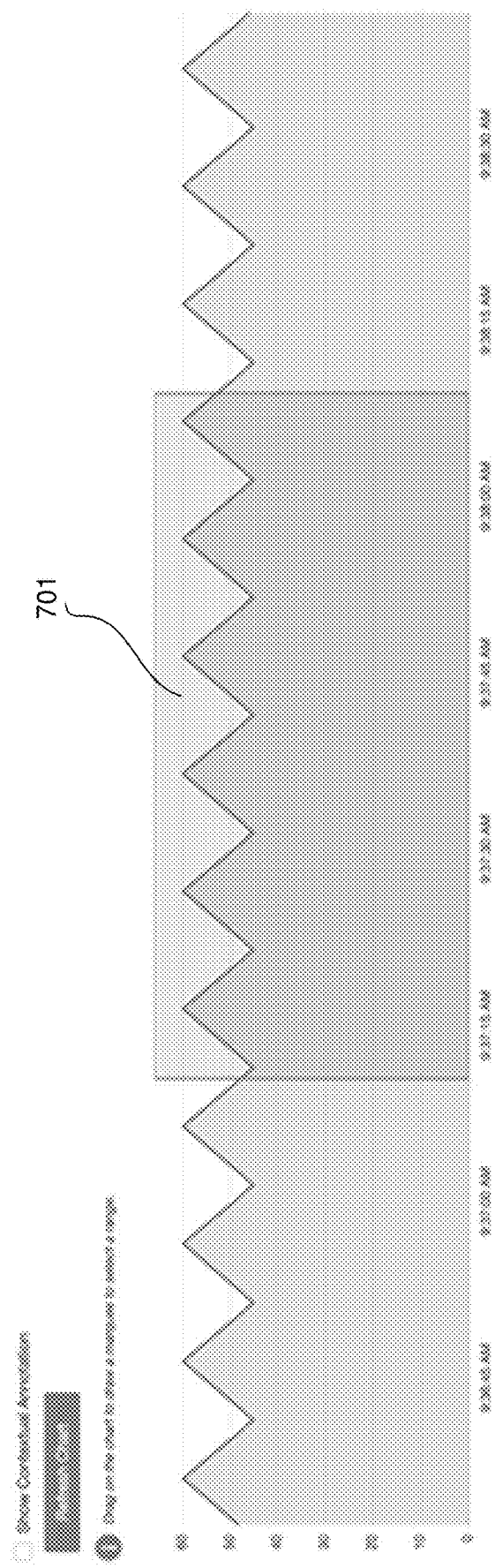
FIG. 7 illustrates an example window of a pattern selected by a user in accordance to embodiments.

For example, assume a user has selected a pattern of interest of 20 points. As soon as configuration is saved, embodiments train that pattern and identify the SAX word. At the same time embodiments also find the frequency of the sensor and the time window of the pattern selected, which can be referred to as "Tp". It may be a 2 minute long window, a 2 hour long window, etc., but it is continuous data selected by the user. FIG. 7 illustrates an example window 701 of a pattern selected by a user in accordance to embodiments. Once the pattern is selected, embodiments continuously invoke the functionality of FIG. 3 to identify patterns. For example, the functionality can be invoked at regular intervals (e.g., every two minutes). Assume its invoked at timestamp T1, embodiments go back in time Tp from T1 and select all the data. The input data would be data between [T1—2minutes—Tp] and [T1]. This is done so as not to miss the continuity of the pattern. Using this as input, embodiments create sliding windows of trained pattern size. Therefore, embodiments create multiple windows and identify a SAX word for each window. Finally, for each SAX word embodiments perform 304 to 310 of FIG. 3.

In embodiments where there are a large number of IoT sensors 101, a gateway between the sensors and the cloud (which can include pattern recognition detector 10) is implemented. Examples of other types of functionality for sensors 101 include measurement of temperature, humidity, CO2 levels, GPS, water level, water presence, electrical current/voltage, light, presence, etc. Small sensors or legacy devices can directly transmit their data to a nearby gateway instead of to the cloud, reducing their power consumption and increasing the sensors' battery life.

The gateway communicates with different types of sensors/devices using different protocols and then sends the data to a cloud service using a standard protocol. The gateway acts as a filter for the huge amount of data sent by the devices, processing the data and sending only relevant information to the cloud. Therefore, the processing and storage services is utilized optimally so that the need for processing and storage is reduced. Further, the response time for the sensors is considerably reduced. The nearby gateway receives the sensor data, processes it, and sends relevant commands back to the sensors. Further, gateways are highly secure and they also help secure the sensors and devices that are connected to them.

Figure 8:
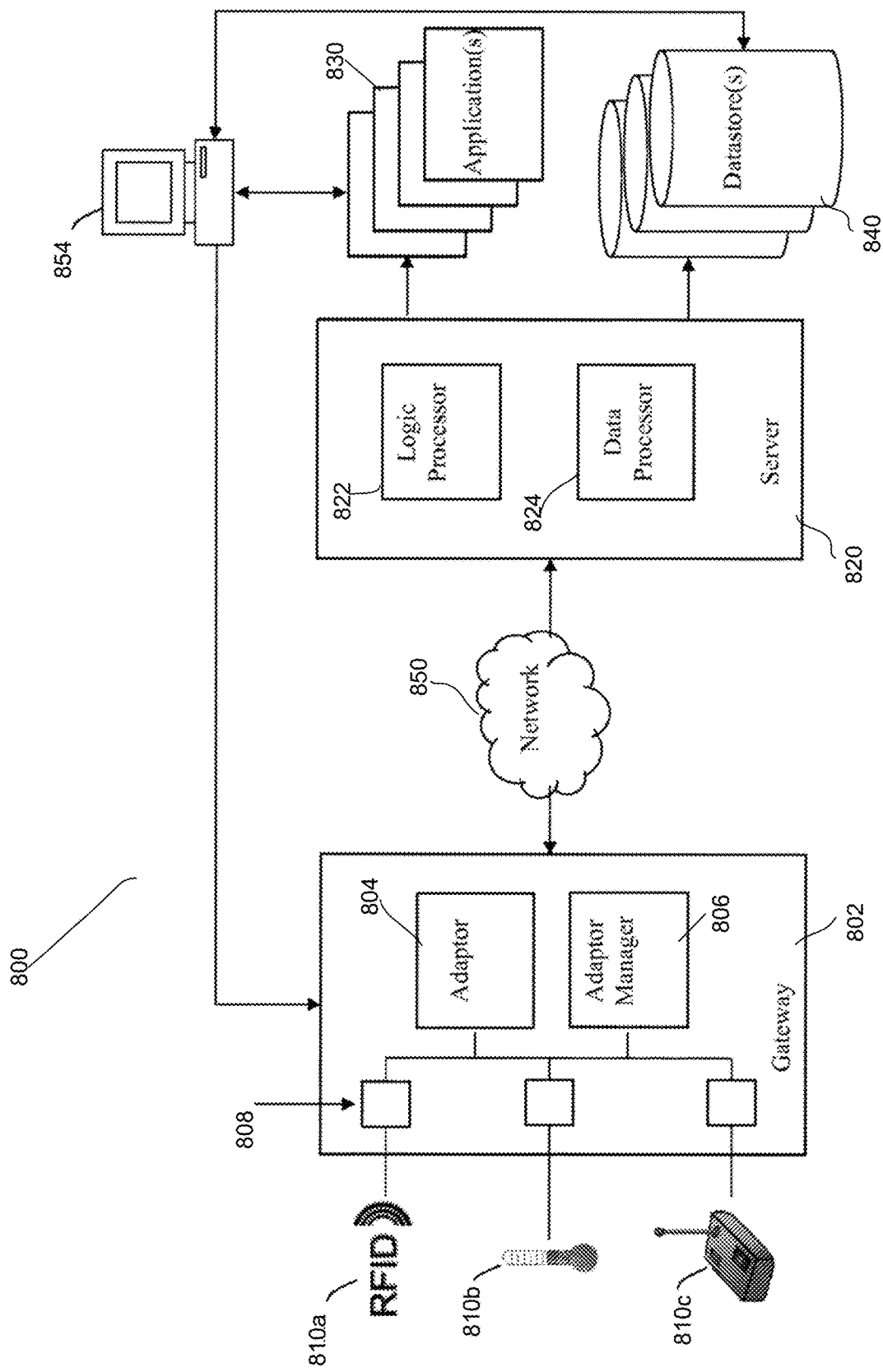
FIG. 8 is a block diagram of a gateway architecture in accordance to embodiments of the invention.

FIG. 8 is a block diagram of a gateway architecture 800 in accordance to embodiments of the invention. Architecture 800 permits effective integration between the systems in the operations technology portion and the systems in the information technology portion of the environment. Architecture 800 generally includes a gateway portion 802 having front-end data collection logic, and a server portion 820 to perform back-end processing of the collected data. To handle many different device/sensor types (including IoT sensors 101) and to provide the ability to handle high numbers of units being deployed in the field, embodiments provide a robust platform for handling issues such as: (a) sensor definition; (b) sensor management; (c) data capture; (d) data processing; (e) data transfer; (f) data storage; (g) analysis; and/or (h) visualizations. This architecture provides a framework for interfacing with any type of local device that may be deployed at a client site, and to allow data captured from those devices to be sent to a remote server, and to have the collected data be both locally and remotely programmatically processed.

Gateway 802 includes a sensor management module that handles the sensor code (e.g., that is implemented as custom code, such as Java code, specific to each sensor hardware). This module captures the sensor data in a generic way so that any type of data can be used. The gateway locally caches data so it can be pre-processed locally and no data is lost when there is no network connectivity. The data preprocessor performs actions such as data filtering using a set of rules. The system throttles the data so that data rates do not overwhelm the capabilities of the client gateway or the network. An internal data store may be included to store data in a platform-agnostic way. A data transfer module is employed to build the data for transmission. The system permits client gateways to talk to each other so as to establish a mesh network ensuring resiliency and connectedness.

In general, gateway 802 performs data acquisition and management of local devices 810a-c. The local devices 810a-c may include any type of equipment that can be suitably managed by architecture 800. For example, any number of sensors may be embedded within the local equipment at various sites. Examples of such sensors include RFID sensors at device 810a, temperature sensors at device 810b, and other types of smart devices, beacons, and/or machines at device 810c (including IoT sensors 101).

Local devices 810a-c can be configured to send data at regular intervals to gateway 802. Such data may include information to be captured from the local devices. For example, information that may be captured include operating conditions, metrics, pressure, vibration, temperature, and/or flow rate.

In additional to above examples for using sensor data, other examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

Gateway 802 includes an adaptor component 804 and an adaptor manager 806. Adaptor component 804 (also referred to herein as an "IoT adaptor") manages the gateway's interaction with local devices 810a-c, and may include device-specific code components 808 to perform its processing with local devices 810a-c. Adapter manager 806 (also referred to herein as an "IoT adaptor manager") is used to manage the operations, versioning, and/or provisioning of local devices 810a-c and adaptor component 804. In some embodiments, gateway 802 processes incoming data with local analytics (e.g., to analyze operating conditions and to identify fluctuations). To the extent necessary, alerts and data readings can be sent in real-time.

The data collected by gateway 802 are sent over a network 850 to server 820. Server 820 efficiently receives data from potentially a multitude of client gateways. The server module parses the data and caches it locally to expedite data capture. Pre-processing of the data may be performed for filtering, applying simple or complex script-based rules, etc. The data may be stored in an internal database. The persisted data can be forwarded to a corporate, generic table store. The server module may also take action based on the result of rules applied on the data, such as calling a web service, invoking further more complex rules, sending control data back to devices, etc. A generic table format can be used to store the sensor data within the enterprise application ecosystem. Keeping the relevant data within the ecosystem allows the use of standard tools in the enterprise application, such as reporting tools and form design tools. This means that users can use their pre-existing tools and systems to process the data from the operations technology ("OT") side, which allows the user to use systems which they are well-versed in using to report on and add intelligence to the data that is captured. An open interface (e.g., a RESTful interface) enables the captured data to be enquired and allows the development of rich, responsive, up-to-date client interfaces.

At server 820, a logic processor 822 (also referred to herein as an "IoT logic processor") and a data processor 824 (also referred to herein as an "IoT data processor") are provided to implement analysis and alert processing. These components may include operations technology and industry-specific rules and scripts.

Server 820 may communicate with one or more applications 830. Such applications 830 may include, for example, functionality to implement inventory management, quality management, condition-based maintenance, and/or provide a visualization portal, as well as functionality of FIG. 3 for determining anomalous sensor data based on pattern recognition. Examples of these applications include, for example, Emergency Shutdown ("ESD") systems, Supervisor Control and Data Acquisition ("SCADA") systems, data analytics tools, BI ("business intelligence") tools, customer relationship management ("CRM") products, enterprise resource planning ("ERP") products, enterprise marketing products, financials applications, and/or procurement applications. The application products are hosted on computing hardware operated by the cloud provider.

Server 820 may also manage the storage of the collected data into one or more datastores 840. Datastore 840 includes any combination of hardware and software that allows for ready access to the data that is located at a computer readable storage device. For example, datastore 840 could be implemented as computer memory operatively managed by an operating system. The data in datastore 840 could also be implemented as database objects and/or files in a file system.

One or more users may exist at one or more user stations 854 that interact with the architecture 800. User station 854 includes any type of computing station that may be used to operate or interface with architecture 800. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 800, such as a mouse or keyboard to manipulate a pointing object in a graphical user interface to generate user inputs.

Either server 820 or the user at user station 854 may provide control signals to gateway 802 to control the operation of the gateway 802 and/or the local devices 810a-c. The control signals may be used to control any operation necessary at the gateway and/or local device 810a-c, including for example, to update and provision control software on the gateway and/or to control operation of the local device. Further details of the functionality of architecture 800, which can be used in conjunction with anomaly detection network/system 150 of FIG. 1, is disclosed in U.S. Pat. No. 10,382,294.

In embodiments, the generated sensor messages are generated as a specialized data structure that includes attributes of sensors, vehicles, etc. In embodiments, the specialized data structure is in the form of an electronic document (e.g., an XML document) and is stored in database 17. A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

As disclosed, embodiments build a set of heuristic that make pattern recognition more tolerable to changing patterns. Embodiment compare known patterns with generated patterns from a sensor to recognize and detect the same or different patterns. Embodiments identify a "hamming" distance between patterns to accommodate for tolerance between the patterns so that an exact match is not required. The matching and recognition of patterns is used to determine the presence or absence of an anomaly for the individual sensor.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of matching sensor data output by a sensor to a trained pattern, the method comprising:
   forming a plurality of windows of an identified pattern from the sensor data, each of the plurality of windows having a substantially equal window length to a length of the trained pattern;
   for each of the windows:
      generating a corresponding first Symbolic Aggregate approximation (SAX) word;
      determining a Hamming distance between the first SAX word and a second SAX word corresponding to the trained pattern;
      determining a final distance score based on coefficients between the first SAX word and the second SAX word;
      determining a number of positions in the first SAX word that do not contribute to the final distance score;
      updating the Hamming distance after eliminating the number of positions;
      determining an average distance based on the final distance score and the updated Hamming distance; and
      comparing the average distance to a predefined distance value.

2. The method of claim 1, wherein the predefined distance value comprises approximately 0.5.

3. The method of claim 1, wherein determining the average distance comprises dividing the final distance score by the updated Hamming distance.

4. The method of claim 1, wherein the comparing comprises determining that the window comprises a matched pattern when the distance is less than the predefined value.

5. The method of claim 1, wherein the trained pattern comprises known non-anomalous data points, wherein the comparing comprises determining that the sensor comprises anomalous behavior when the distance is greater than the predefined value.

6. The method of claim 1, wherein the sensor comprises an Internet of Things device coupled to an asset and outputs a time series of data points.

7. The method of claim 1, the generating a corresponding first SAX word comprising:
   transforming a time series of data points into a Piecewise Aggregate Approximation (PAA); and
   converting the PAA into a string of symbols.

8. A non-transitory computer-readable medium storing instructions which, when executed by at least one of a plurality of processors, cause the processors to match sensor data output by a sensor to a trained pattern, the matching comprising:
   forming a plurality of windows of an identified pattern from the sensor data, each of the plurality of windows having a substantially equal window length to a length of the trained pattern;
   for each of the windows:
      generating a corresponding first Symbolic Aggregate approximation (SAX) word;
      determining a Hamming distance between the first SAX word and a second SAX word corresponding to the trained pattern;
      determining a final distance score based on coefficients between the first SAX word and the second SAX word;
      determining a number of positions in the first SAX word that do not contribute to the final distance score;
      updating the Hamming distance after eliminating the number of positions;
      determining an average distance based on the final distance score and the updated Hamming distance; and
      comparing the average distance to a predefined distance value.

9. The computer-readable medium of claim 8, wherein the predefined distance value comprises approximately 0.5.

10. The computer-readable medium of claim 8, wherein determining the average distance comprises dividing the final distance score by the updated Hamming distance.

11. The computer-readable medium of claim 8, wherein the comparing comprises determining that the window comprises a matched pattern when the distance is less than the predefined value.

12. The computer-readable medium of claim 8, wherein the trained pattern comprises known non-anomalous data points, wherein the comparing comprises determining that the sensor comprises anomalous behavior when the distance is greater than the predefined value.

13. The computer-readable medium of claim 8, wherein the sensor comprises an Internet of Things device coupled to an asset and outputs a time series of data points.

14. The computer-readable medium of claim 8, the generating a corresponding first SAX word comprising:
   transforming a time series of data points into a Piecewise Aggregate Approximation (PAA); and
   converting the PAA into a string of symbols.

15. A sensor network comprising:
   one or more sensors that correspond to a single asset and adapted to generate sensor data; and
   a pattern recognition detector coupled to the sensors via a communication network and comprising one or more processors that match the sensor data output by each sensor to a trained pattern, the pattern recognition detector adapted to:
      form a plurality of windows of an identified pattern from the sensor data, each of the plurality of windows having a substantially equal window length to a length of the trained pattern;
      for each of the windows:
         generating a corresponding first Symbolic Aggregate approximation (SAX) word;

determining a Hamming distance between the first SAX word and a second SAX word corresponding to the trained pattern;

determining a final distance score based on coefficients between the first SAX word and the second SAX word;

determining a number of positions in the first SAX word that do not contribute to the final distance score;

updating the Hamming distance after eliminating the number of positions;

determining an average distance based on the final distance score and the updated Hamming distance; and comparing the average distance to a predefined distance value.

16. The sensor network of claim 15, wherein the predefined distance value comprises approximately 0.5.

17. The sensor network of claim 15, wherein determining the average distance comprises dividing the final distance score by the updated Hamming distance.

18. The sensor network of claim 15, wherein the comparing comprises determining that the window comprises a matched pattern when the distance is less than the predefined value.

19. The sensor network of claim 15, wherein the trained pattern comprises known non-anomalous data points, wherein the comparing comprises determining that the sensor comprises anomalous behavior when the distance is greater than the predefined value.

20. The sensor network of claim 15, wherein the sensors comprise an Internet of Things device coupled to an asset and outputs a time series of data points.

* * * * *